(12) United States Patent
Buck et al.

(10) Patent No.: US 11,336,684 B2
(45) Date of Patent: May 17, 2022

(54) MOBILE DEVICE SECURITY USING A SECURE EXECUTION CONTEXT

(71) Applicant: Lookout Inc., San Francisco, CA (US)

(72) Inventors: Brian James Buck, Livermore, CA (US); Karina Levitian, San Francisco, CA (US); Francis Kelly, Albany, CA (US); Sebastian Krawczuk, Alameda, CA (US); Michael Murray, Oakland, CA (US)

(73) Assignee: LOOKOUT, INC., San Francisco, CA (US)

( * ) Notice: Subject to any disclaimer, the term of this patent is extended or adjusted under 35 U.S.C. 154(b) by 121 days.

(21) Appl. No.: 16/810,446

(22) Filed: Mar. 5, 2020

(65) Prior Publication Data

US 2020/0389491 A1 Dec. 10, 2020

Related U.S. Application Data

(60) Provisional application No. 62/858,670, filed on Jun. 7, 2019.

(51) Int. Cl.
*H04L 9/32* (2006.01)
*H04L 29/06* (2006.01)

(52) U.S. Cl.
CPC ........ *H04L 63/1466* (2013.01); *H04L 9/3247* (2013.01); *H04L 63/0435* (2013.01); *H04L 63/107* (2013.01); *H04L 63/1416* (2013.01); *H04L 63/1425* (2013.01)

(58) Field of Classification Search
CPC ............. H04L 63/1466; H04L 63/0435; H04L 63/107; H04L 63/1416; H04L 63/1425; H04L 9/3247; H04L 9/3236; G06F 21/53; G06F 21/55; G06F 21/6218; G06F 21/74; G06F 9/45558
USPC ...................................................... 726/22–25
See application file for complete search history.

(56) References Cited

U.S. PATENT DOCUMENTS

| | | | | |
|---|---|---|---|---|
| 8,099,596 B1* | 1/2012 | Rusakov | ................. | G06F 21/53 |
| | | | | 713/164 |
| 8,387,141 B1* | 2/2013 | Zhukov | ................... | H04L 51/12 |
| | | | | 726/22 |
| 2004/0111578 A1* | 6/2004 | Goodman | ........... | G06F 9/45558 |
| | | | | 711/163 |
| 2006/0265761 A1* | 11/2006 | Rochette | ................ | G06F 21/53 |
| | | | | 726/27 |
| 2008/0182592 A1* | 7/2008 | Cha | ........................ | H04L 63/107 |
| | | | | 455/456.3 |

(Continued)

*Primary Examiner* — Kambiz Zand
*Assistant Examiner* — Mahabub S Ahmed
(74) *Attorney, Agent, or Firm* — David R. Stevens; Stevens Law Group

(57) ABSTRACT

A device includes a secure execution context that is segregated from an operating system of the device. A security application executing in the operating system interfaces with the secure execution context to obtain verified data. The secure execution context may verify that operating system files are free of malware, obtain sensor readings that may be cryptographically signed, verify functioning of a baseband processor, and verify other aspects of the function and security of the device. The verified data may be used for various purposes such as verifying location of the device, training a machine learning model, and the like.

19 Claims, 8 Drawing Sheets

(56) References Cited

U.S. PATENT DOCUMENTS

| | | | |
|---|---|---|---|
| 2009/0328042 A1* | 12/2009 | Khosravi | G06F 21/52 718/100 |
| 2011/0219449 A1* | 9/2011 | St. Neitzel | G06F 11/00 726/23 |
| 2012/0159156 A1* | 6/2012 | Barham | G06F 21/604 713/156 |
| 2013/0219176 A1* | 8/2013 | Akella | H04L 63/0435 713/165 |
| 2013/0247117 A1* | 9/2013 | Yamada | G08C 17/02 725/93 |
| 2013/0301830 A1* | 11/2013 | Bar-El | H04L 9/3271 380/210 |
| 2014/0075496 A1* | 3/2014 | Prakash | G06F 21/64 726/1 |
| 2015/0067864 A1* | 3/2015 | Barkan | G06F 21/561 726/24 |
| 2015/0242629 A1* | 8/2015 | Lindo | G06F 21/6236 726/1 |
| 2015/0358301 A1* | 12/2015 | Dalbehera | G06F 21/57 713/171 |
| 2016/0191554 A1* | 6/2016 | Kaminsky | G06F 21/31 726/23 |
| 2017/0103378 A1* | 4/2017 | Pan | G06Q 20/3278 |
| 2017/0277570 A1* | 9/2017 | LaMantia | G06F 9/5038 |
| 2017/0317832 A1* | 11/2017 | Surdu | G06F 21/53 |
| 2017/0346851 A1* | 11/2017 | Drake | H04L 63/0428 |
| 2018/0270260 A1* | 9/2018 | Govardhan | G06N 20/00 |
| 2019/0097972 A1* | 3/2019 | Coleman | G06F 21/53 |
| 2019/0098007 A1* | 3/2019 | Coleman | H04L 63/08 |
| 2019/0132739 A1* | 5/2019 | Raleigh | H04L 63/1425 |
| 2019/0156036 A1* | 5/2019 | Dabak | G06F 12/1009 |
| 2019/0286121 A1* | 9/2019 | Bando | G05D 1/0016 |
| 2020/0285737 A1* | 9/2020 | Kraus | H04L 63/1408 |

* cited by examiner

MOBILE DEVICE SECURITY USING A SECURE EXECUTION CONTEXT

RELATED APPLICATIONS

This application claims the benefit of U.S. Provisional Application Ser. No. 62/858,670 filed Jun. 7, 2019 and entitled DEVICE SECURITY.

BACKGROUND

In a modern enterprise, there is a wide array of devices in use by members of the enterprise, all of which may store or generate sensitive data. It is in the interest of the enterprise to protect the security of its data on each device on which it may be found. However, some devices may also be used for personal matters by a member of the enterprise or while the member of the enterprise is conducting personal matters.

Accordingly, there is a need to balance the need for security with protection of privacy.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
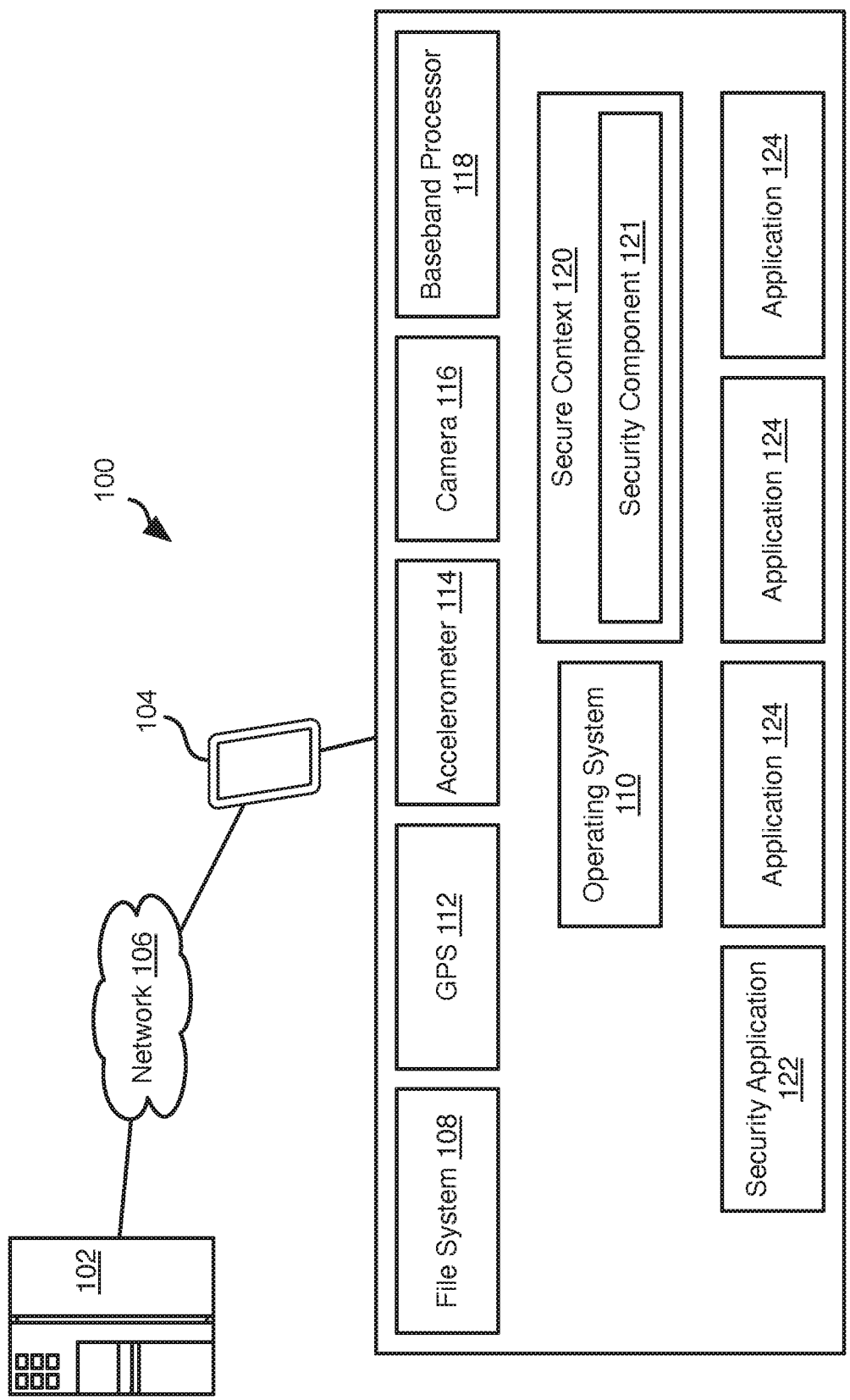
FIG. 1 is a schematic block diagram of a network environment for performing methods in accordance with an embodiment of the present invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Objective-C, Swift, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 illustrates a network environment 100 of an enterprise in which the systems and methods disclosed herein may be implemented. The network environment 100 may include a server system 102 that includes one or more computers.

Members of the enterprise may use various devices 104 that may be embodied as mobile phones, tablet computers, laptop computers, desktop computers, wearable computers, personal digital assistants (PDA), electronic book or book reader, digital camera, digital video camera, video game console, voice controlled assistant, drone, unmanned aerial vehicle (UAV), robot, robotic appliance, smart television, set top box, router, cable modem, ambient computing device (located in a mostly fixed location and available to multiple users located in the vicinity of the device, e.g. a smart room), a computing device embedded in a vehicle (automobile, plane, etc.), ingestible or body-implanted devices, smart fabrics or clothing, or other computing devices.

The systems and methods disclosed herein are particularly applicable where at least a portion of the devices 104 are mobile and can be expected to change location over time. The mobile devices 104 may execute a mobile operating system. Mobile devices can also include devices in automobiles, planes, or other vehicles, such as an embedded computing or communication system that communicates via the Internet over a cellular phone system or Wi-Fi or other communications technologies, or other portable computing devices (e.g., devices that pair with a mobile device using Bluetooth, such as an Apple watch).

Additional examples of mobile devices include devices that are part of what is called "the internet of things" (IoT). In the IoT there are multiple devices which operate without accompanying and attendant users. Such devices can be mobile or sessile; they can have various sensors and computing and communication capabilities and can run applications; schematically they can be considered substantially similar to a mobile device. One will appreciate that the mobile devices described herein may include any computer or computing device running an operating system for use on handheld or mobile devices, such as smartphones, PDAs, tablets, mobile phones and the like. For example, a mobile device may include devices such as the Apple iPhone®, the Apple iPad®, or any device running the Apple iOS™, Android™ OS, Google Chrome™ OS. As used herein, the mobile communication device may also be referred to as a mobile computing device, a mobile client, or simply, as a device or as a client.

The user devices 104 may also be desktop computers or other server computers executing an operating system. User devices can include devices such as a smartphone, a laptop computer, a desktop computer, a mobile device, a wearable computing device, a personal digital assistant (PDA), a tablet computer, an electronic book or book reader, a digital camera, a video camera, a video game console, a voice controlled assistant, a drone, a UAV, a vehicle, a personal robot, a robotic appliance, a smart TV, a set top box, a router, a cable modem, a tablet, a server, a thing in IoT, an ambient computing device (located in a mostly fixed location in a room or location, available to multiple users located in the vicinity of the device, smart rooms, etc.) and/or any other suitable computing device.

The devices 104 may interact with the server system 102 by way of a network 106, such as a local area network (LAN), wide area network (WAN), the Internet, or any other type of wired or wireless network connection. Mobile devices 104 may communicate via the Internet over a cellular data network, WI-FI or other communications technologies, or other portable computing devices (e.g., devices that pair with a mobile device using BLUETOOTH, such as an APPLE watch).

The server system 102 may function as a security server. For example, the server system 102 may function as an Identity Access Management (IAM) server, or a device management server (such as an MDM (mobile device management) server or an EMM (enterprise mobility management) server). The server system 102 may implement one or more enterprise services, such as file servers, database servers, or other custom server applications performing functions specific to the enterprise. The mobile device 104 may further access other services provided by third parties for the benefit of the enterprise. Any of these servers may be implemented using container services or other virtualization services in a cloud or edge computing environment, and each server may actually exist as multiple instances.

The user device 104 may include a file system 108, such as stored in a persistent storage device of the device 104 and managed by an operating system 110 of the device 104. The device 104 may include various sensors, such as a global positioning system (GPS) receiver, accelerometer 114, and a camera 116. These sensors are exemplary only and other sensors may also be incorporated, such as a compass, gyroscope, humidity sensor, thermometer, or other sensors known in the art.

The user device 104 may include a baseband processor 118 that manages the transmitting and receiving of data using radios (cellular, WI-FI, BLUETOOTH, etc.) of the device 104. As known in the art, the baseband processor may further manage the encryption and decryption of communications.

The device 104 may include a secure context 120 in addition to the operating system 110 and which is independent and isolated from the operating system 110. The secure context may be a trusted execution environment (TEE) such as can be implemented using the TRUSTZONE technology on ARM processors or a trusted platform module (TPM), or a secure element (SE). The TEE environment can be a secure area of the main processor, the data loaded into this environment can be protected with respect to confidentiality and integrity. The TEE environment can provide security features such as isolated execution. The secure context 120 may include an operating system that is isolated from the user-facing operating system 110 and therefore more secure. The secure context 120 may be implemented using one or both of separate hardware (e.g., separate portion of processor) and separate software that is executed and accessible only within the secure context 120. For purposes of this disclosure actions are described as being performed "by the secure context 120" or "in the secure context 120," which shall be understood to refer to actions performed by executable code being executed within the secure context 120.

A security application 122 may be programmed and authorized to interface with the secure context 120. In particular, the security application 122 may interface with a security component 121 in the secure context 120 in order to implement the methods disclosed herein. Other applications 124 on the device 104 may access the secure context 120 according to the methods disclosed herein by making requests and receiving responses from the security application 122. The security application 122 can be a security component executing within the normal operating system 110. The security application 122 can be a security component embedded in an operating system 110 and/or a portion of an application. The security application 122 can also be a security component that is a part of the operating system 110 and/or firmware. The functions ascribed herein to the security application 122 may also be performed by a component executing on a baseband or other special processor. In some embodiments the security application is an application installed on the device 110. In some embodiments, some or all of the functions ascribed herein to the security application 122 may instead be performed by the security component 121 executing within the secure context 120.

The security application 122 and the security component 121 in the secure context 120 may be used as discussed herein to detect and reduce risks related to operating system compromise, malware, unverified sensor readings, network connection compromise, and network connections to untrustworthy destinations.

Figure 2:
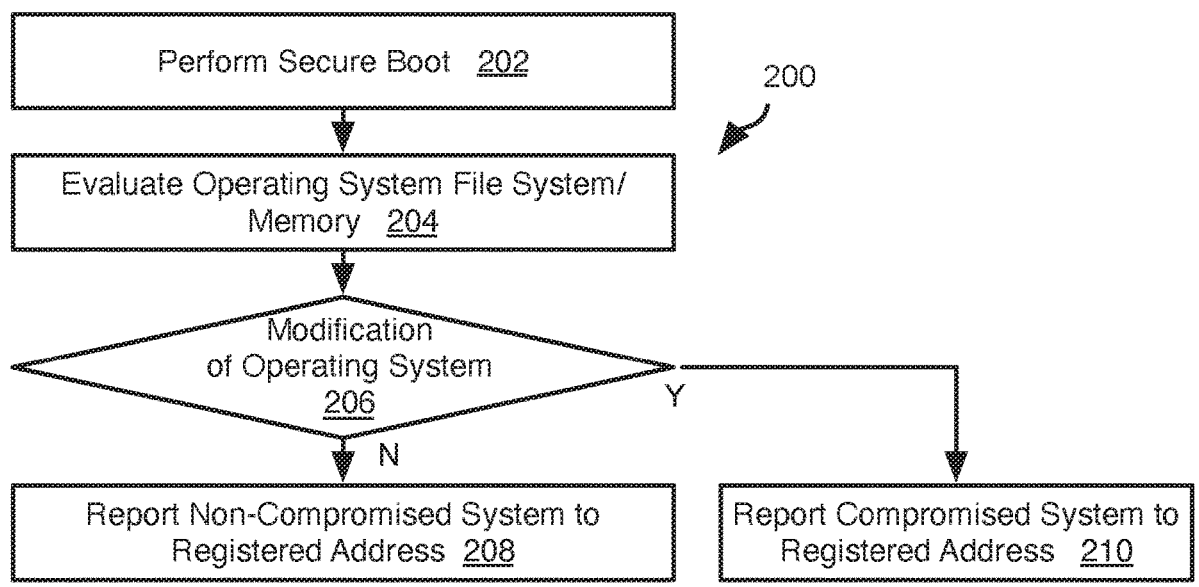
FIG. 2 is a process flow diagram of a method for detecting whether an operating system is compromised using a secure execution context in accordance with an embodiment of the present invention.

FIG. 2 illustrates a method 200 for detecting a compromised operating system 110 on the device 104 using the secure context 120, security component 121 in the secure context 120, and the security application 122. There are many possible ways in which an operating system can be compromised such as zero-day vulnerability exploitation, fileless malware, jail-breaking, rooting or other means. The method 200 may detect compromise by the contents of the file system 108. The method 200 may likewise detect compromise by detecting changes in the firmware of the device 104 or changes to the process tables or other structures of the operating system 110 of the device 104.

The method 200 may include performing 202 a secure boot up within the secure context 120. The method 200 may be performed each time the device 104 is started, periodically based on a predefined interval, or based on some other repetition criteria. The security application 122 may then instruct the security component 121 in the secure context 120 to evaluate 204 the state of the file system of the operating system 110. The security component in the secure context 120 or the secure context 121 may then perform this task, which includes evaluating the files (executable and others) of the normal operating system and possibly the firmware of the device 104 to determine that the files are authentic, or that no additional operating system code or firmware files have been added, or that no required operating system code or firmware have been removed. The secure context 120 may have read only access to all files of the device 104, including those of the operating system 110.

The security component 121 may use this access to compare a predefined representation of the files to a representation of the current files of the operating system and possibly firmware. For example, pre-defined hashes of files or directories may be compared to hashes (e.g., non-locality sensitive hashes) of corresponding files or directories of the operating system that are currently stored on the device 104. If the hashes do not match, then the operating system may be found 206 to have been compromised. If not, the operating system 110 may be found not to be compromised based on the evaluation of step 204.

In some embodiments, step 204 may include the secure context 120 or the security component in the secure context 121 evaluating whether a firmware version of the device 104 is up to date and whether an update is required. The secure context 120 or the security component 121 may obtain a version number of the installed firmware for the device 104 and the latest version number of the firmware available from the server system 102 in order to determine whether the firmware is up to date. If not the device 104 may be found 206 to be compromised until the firmware is made current.

This is just one example of how step 206 may be performed. In particular, any approach for detection of malware, viruses, or other threats to device may be performed with respect to the file system and possibly firmware of the device 104 in order to detect whether the normal operating system 110 has been compromised. The method 200 may further be extended to evaluate application files to determine whether an application 124 is operating in a compromised environment.

A notification of the result of step 206 may be provided 208, 210 to the server system 102. In particular, the secure context 120, security component 121 or security application 122 may be configured to establish a network connection to a server 102 having its address (e.g., internet protocol (IP) address) registered with the security component 121, secure context 120 or security application 122. In this manner, the normal operating system 110 may be bypassed when making reports. In some embodiments, a report to the server 102 is only made if the operating system is found 206 to be compromised.

Following execution of the method 200, the normal operating system 110 may be booted up and allowed to execute. Where malware or other suspicious files are found, these may be removed prior to booting up the operating system 110. Alternatively, boot up may be blocked until the files of the operating system are restored to authentic form. In at least one embodiment, the steps of method 200 are performed periodically on device, where the performance is not related to the operating system booting up.

Figure 3:
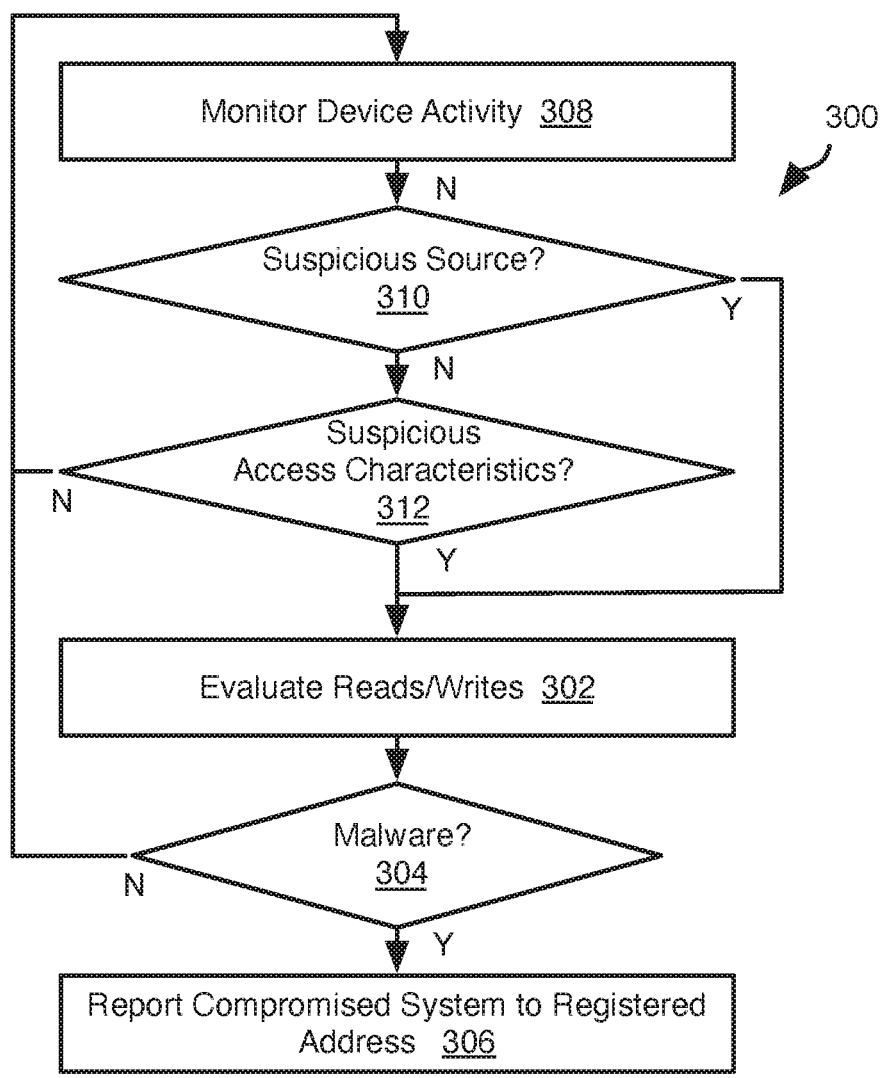
FIG. 3 is a process flow diagram of a method for detecting malware using a secure execution context in accordance with an embodiment of the present invention.

FIG. 3 illustrates a method 300 for detecting installation of malicious software on the device 104 using the secure context 120 or the security component 121 in the secure context 120 and the security application 122. There are many possible avenues for malicious software to become installed on a device, including side-loaded app installation, among other things. It would be desirable to be able to detect installation of malware on a device in a manner which does not depend on there being no compromise of the operating system 110.

The method 300 may include evaluating 302, by the secure context 120 or the security component 121 in the secure context 120, file system reads and/or writes that correspond to installation of a new application, e.g. reads and writes to directories storing application executables and other files, changes to data within the device 104 listing installed applications, or other file system accesses that are performed on the device 104 when installing an application according to the type of the operating system 110.

The evaluating 302 may include evaluating whether the reads and writes correspond to malicious code. For example, step 302 may include evaluating a signature of the files written to see if they match signatures of known malware or other malicious code. Step 302 may include evaluating the source of the reads and writes to determine whether they are from a suspicious application or remote computer. Step 302 may include any approach for virus detection known in the art. Step 302 may further include evaluating whether reads or writes are part of a legitimate installation, e.g., executed by installation package invoked by a user and signed by a reputable source. Where this is the case, the reads or writes may be deemed not to correspond to malicious activity. Step 302 may include determining whether reads and/or writes are anomalous with respect to a history of reads and/or writes on this device or a collection of devices; a read and/or write may be anomalous in that the file read and/or write infrequently has a read and/or write operation against it, or in that the application or library or component reading or writing the file is unusual to read or write that file, or that an inherent characteristic or content of the file being written is unusual in some manner, e.g., is a malformed file format or is a type of file not normally in this location, etc.

Where the reads or writes are found 304 to correspond to malware, or are suspected of being possible malware based on anomalous behavior of the reads and/or writes, the method 300 may include reporting 306 that the device 104 is compromised to the server system 102, such as by transmitting a message reporting this fact to an address registered with the secure context 120 or the security component 121 in the secure context 120 or the security application 122.

In some embodiments, if malware is found 304 to be responsible for the reads or writes, the secure context 120 or the security component 121 in the secure context 120 may be configured to not reply to calls from the normal operating system 110 since it may be compromised. The secure context or the security component 121 in the secure context 120 may be further configured to perform file system level modifications on the device 104 that make the malware inaccessible for launching by the operating system 110.

In some embodiments the security component 121 (or a trusted application "TA") associated with the secure context 120 may monitor 308 characteristics of activity on the device that resulted in an installation to determine whether to observe the file system writes and/or reads of an application or other component attempting to install on the device 104. The method 300 may include evaluating 310 whether the source of software to be installed is suspicious, e.g., not signed, signed by an unknown source, or signed by a source with a low reputation score in a database of signer scores accessible by the secure context 120 or the security component 121 in the secure context 120. If so, the source may be deemed suspicious. Step 310 may include evaluating whether the installation is in response to an instruction from a remote computer that has not previously connected to the device, or other aspect of the source. If so, the installation may be deemed suspicious.

The method 300 may include evaluating 312 access characteristics preceding the installation. For example, if the new software is being installed in response to a user's interaction with an application that has not previously installed software on the device 104 or is otherwise not known to be configured to install software.

If either of steps 310 and 312 indicate suspicious activity, then steps processing may continue at step 302 with evaluation of read and/or writes by the component performing the installation and/or the installed software itself. Where steps 310 or 312 do not indicate suspicious activity, then further evaluation 302 may be omitted in order to preserve battery life and avoid impairment of performance of the device 104.

In at least one embodiment, the one or more sensor readings are obtained by the secure context 120 or the security component 121 in the secure context 120. The sensor readings are compared to the associated sensor reading from the normal operating system 110, application, and/or security application 122 installed on the device 104. The determination whether the one or more sensor readings match the associated readings from the normal operating system 110 can be used to determine whether the normal operating system 110 is compromised. Likewise, the determination whether the one or more sensor readings match the associated readings of an application can be used to determine whether the application is compromised. In at least one embodiment, matching can include the values corresponding to one another within a threshold margin of error. In at least one embodiment, applications that are configured to change the sensor reading (e.g., VPN, privacy preserving browser) can be excluded from comparing to the sensor reading of the secure context. For example, in an analysis of applications on the device 104, the sensor readings from the secure context 120 or the security component 121 in the secure context 120 can be compared to the associated readings from all applications excluding the excluded applications that are configured change the sensor readings. The analysis can flag applications as malware when they are not excluded applications and indicate a different sensor reading from the corresponding sensor reading of the secure context 120.

In at least one embodiment, the secure context 120 or security component 121 can create a file or a set of files on the portion of the system area outside the secure context 120, e.g. a file system managed by the normal operating system 110. The secure context 120 or security component 121 can periodically verify that the file or set of files have not been changed. If the secure context 120 or security component 121 determines that the file or set of files have been changed, it can determine that the device 104 is compromised.

Once the secure context 120 or the security component 121 associated with the secure context 120 determines that the device 104 is compromised, a remedial action and/or notification action can be taken. Devices 104 that are compromised can be compromised in a way that limits the communication from the secure context 120 to a security server 102 (enterprise server, etc.) because the communication can be routed through the normal operating system 110, and not through the secure context 120. In some embodiments, the compromised devices 104 can include malware that blocks or manipulates communication by the secure context 120. In some configurations a secure context 120 or the security component 121 can communicate with the security application 122 located outside the secure context 120 on the device 104. When the secure context 120 or security component 121 can determine that the security application 122 is not compromised, it can use the security application 122 to communicate with remote services (e.g., enterprise security server).

The secure context 120 or the security component 121 can store a verification value and use it to verify that the security application 122 on the non-secure portion of the device 104 is not compromised. In at least one embodiment, the secure context 120 or the security component 121 can store a verification value such as a checksum, hash, digest, digital fingerprint, or similar digital representation. The verification value can represent the verification value of a non-compromised security application 122 of the normal operating system 110 stored outside the secure context 120. In some embodiments, the secure context 120 or the security component 121 can request a verification value of the security application 122 and compare the verification value against the expected verification value stored in the secure context 120 or the security component 121. This comparison operation can be performed periodically, on a schedule, randomly, or in response to a potential detected threat. For example, if the secure context 120 or security component 121 detects a threat on the device 104 associated with the secure context 120, it can initiate a verification of a hash value of the security application 122. If the security application 122 is determined to be uncompromised then the secure context 120 or security component 121 can use the security application 122 in responding to a detected threat.

In at least one embodiment, the secure context 120 or security component 121 can be associated with a security certificate or similar indicator of identity. The secure context 120 or security component 121 can transmit a message signed using the security certificate to the security application 122. This message can be configured to be sent to a server 102. Upon receiving the message from the secure context 120 or the security component 121 via the security application 122, the server 102 can review the message and confirm that it has not been tampered with. If the server 102 determines that the device 104 is compromised because the message has been tampered with, this can serve as an "SOS" message and the server 102 can take remedial action and/or notification action. In some embodiments, the server 102 can verify that the information it received from the security component 121 is legitimate and the message has not been tampered with. The server 102 can further transmit another message to the security application 122 intended to be transmitted to the secure context 120 or the security component 121. If the message received by the secure context 120 or the security component 121 is determined to be modified then it can be determined that the security application 122. If the message received by the secure context 120 or the security component 121 is determined to not be modified, then it can be determined that the security application 122 is not comprised and therefore can be used to respond to a detected threat.

In at least one embodiment, the secure context 120 or the security component 121 can be configured to receive or send a health check (e.g., heartbeat) message to/from the security server 102. For example, the secure context 120 or the security component 121 can be configured to receive a health check message from the server 102 at a specific interval (or scheduled time) and, when the health check message is not received at that interval or scheduled time, it can determine that there is a potential communication issue with the server 102 or with the device 104. In some embodiments, the secure context 120 or the security component 121 can be configured to send a health check message to the server 102 at a specific interval (or scheduled time) and when the health check message is not received by the server 102 at this interval or scheduled time, it can determine that there is a potential communication issue with the secure context 120 communication abilities and/or with the device 104. Based on issues determined with the health check message communication, additional tests such as sensor reading comparisons as disclosed elsewhere herein can be performed to determine whether the normal operating system 110 is compromised. Additionally, based on the health check message communication issues from the server 102 to the secure context 120 or the security component 121 can determine that a remedial action on the device 104 should be performed when a compromise is discovered. In some embodiments, when the secure context 120 or the security component 121 determines that no health check messages have been received from the server 102 and the server communication is compromised, and when a compromise on the normal operating system 110 is determined, the secure context 120 or the security component 121 can initiate a remedial action that doesn't require off-device communication such as reinstalling the normal operating system 110. In some embodiments, when the server 102 does not receive a threshold amount of health check messages from the device 104 (e.g., from the security application 122, the secure context 120, or the security component 121), it can determine that the device 104 could be comprised and can notify other services of this determination (e.g., notify the enterprise server and the enterprise server can block access, notify a bank service so that it limits services to the device 104, etc.).

In some embodiments, remedial actions taken in response to determining a compromise can include reinstalling the operating system 110 of the device 104, blackholing internet connectivity, uninstalling the source of the compromise, disconnecting from enterprise services (e.g., enterprise email), disconnecting from highly sensitive data services (e.g., banking data, health data, photographs, location data), reconstructing the compromised portions of the normal operating system 110, or crashing the device 104 (e.g., prevent it from working).

In some embodiments, the notification action can include notifying the enterprise server of the compromise, notifying security services, displaying a notification message (e.g., flashing a light, displaying a message, generating a sound), notifying other devices of compromises (e.g., mobile watch), notify devices via short range communication channels (e.g., BLUETOOTH, UWB (ultrawideband), ZWave, ZigBee), etc. The notification action can be initiated by an "SOS" message such as DNS (domain name service) request, request for specific data, ICMP (internet control message protocol) message, or a ping to an IP (internet protocol) address.

Figure 4:
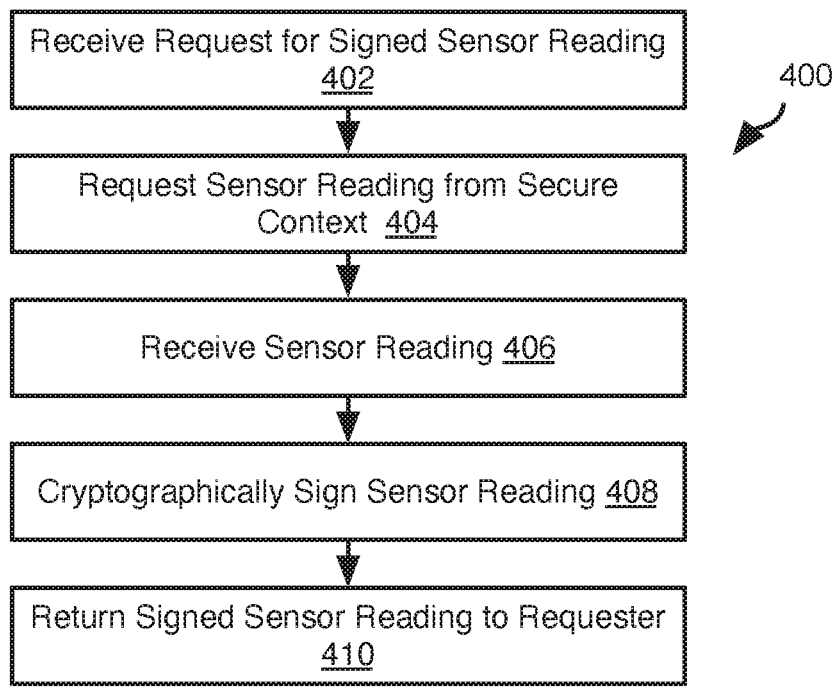
FIG. 4 is a process flow diagram of a method for providing signed sensor readings using a secure execution context in accordance with an embodiment of the present invention.

FIG. 4 illustrates a method 400 for obtaining signed sensor readings on the device 104 using the secure context 120 or security component 121 and the security application 122. Sensor readings from a device 104 can be important to a server in the cloud, such as the server system 102 or another server. However, when an application 124 is obtaining the sensor readings from the normal operating system 110, malicious code in the normal operating system 110 could be modifying the sensor readings before transmission to the server in the cloud. It would be desirable if there were a way in which the server in the cloud could be assured that the sensor readings received are authentic and not modified from their original form as captured by a sensor on the device 104.

There are many situations in which it would be desirable to have an assurance of authentic sensor readings. For example, geolocation sensor readings, authentic image pixels, verified date/time and/or location provenance for other readings, verified associated identity of a person performing sensor readings, for verified native biometric sensor readings (fingerprint, iris, facial recognition, etc.), for verified behavioral biometric readings (typing dynamics, touch dynamics, device-holding behavior, device falls (e.g., shock sensor), gait, and many more).

The method 400 may be used to provide an application with a sensor reading that has been signed (e.g., a signing chain up to the hardware root of trust). The method 400 may include the security application 122 receiving 402 a request for a signed sensor reading from a requestor. The requester may be another application 124, the server system 102, or from a web application running in a browser application 124, or some other cloud-based server. The request may specify the sensor from which the reading should be obtained, e.g. sensors 112-116 or some other sensor.

The security application 122 may request 404 a sensor reading from the secure context 120 or the security component 121. The secure context 120 or the security component 121 may then access the requested sensor and obtain a reading (GPS location, accelerometer reading, image from camera, etc.). The secure context 120 or the security component 121 may return the sensor reading to the security application 122 associated with the normal operating system 110. The security application 122 receives 406 the sensor reading and cryptographically signs 408 the sensor reading to obtain a signed sensor reading and returns 410 the signed sensor reading to the requestor. Alternatively, the secure context 120 or the security component 121 may sign the sensor reading and return the signed sensor reading to the requestor by way of the security application 122. The manner by which the security application 122 (or the secure context 120 or security component 121) cryptographically signs the sensor reading may be according to any approach known in the art. In some embodiments, the cryptographic signing may be done by the secure context 120 or the security component 121. In some embodiments, a hardware key that is hard-wired in the device 104, such as the processor of the device 104, may be used by the secure context 120, security component 121, or the security application 122 to sign the sensor reading. Other data that may be used for cryptographic signing may include a code in a device driver, code in the normal operating system 110 or secure context 120 (i.e., by security component 121 in the secure context 120), code in an associated processor of the device 104, such as a baseband processor, a motion coprocessor, or a neuroprocessor.

The cryptographic signature may provide a certificate chain up to a hardware root of trust (e.g., the hardware key). As known in the art, the cryptographic signature enables the requester to verify that the sensor reading has not been altered.

In some embodiments, the cryptographically signed sensor reading may include other data that is also signed. In particular, a timestamp associated with the sensor reading may be included.

In one example, a cloud server needs to know that a location as reported by the device 104 is accurate and has not been falsified or substituted by a man-in-the-middle (MITM) or other type of attacker. The cloud server therefore requests a signed sensor reading from the GPS receiver 112 according to the method 400 in order to verify that the location in the sensor reading is authentic. The reading from the GPS receiver 112 may further include a timestamp enabling the server to verify the time at which the device 104 was at the location.

In another example, the sensor reading is an image from the camera 116. The pixel data of the image may be cryptographically signed according to the method 400. The metadata that is also signed may include a timestamp, an identifier of the device 104 (e.g., hardware key), a description of the image format, a description of the camera 116 (e.g., model number, attributes of lenses or detector), exchangeable image format (Exif) metadata, or other data that may be used to detect if the pixel data is altered. In at least one embodiment, the sensor reading can be cryptographically signed in the secure context 120 (e.g., by the security component 121 in the secure context 120). In some embodiments, the security application 122 can cryptographically sign communication from the secure context 120 or the security component 121.

In another example, signed sensor readings are used to train a machine learning model according to any machine learning algorithm known in the art. The sensor readings used may include those that provide behavioral biometrics that can be used to verify the identify the user of the device 104 or determine that the current user is not the authorized user of the device. These sensor readings may include readings from the accelerometer and/or a gyroscope of the device 104. The training may be performed in the secure context 120 or using readings signed by the secure context 120 or the security component 121. Once the model is trained, it could be cryptographically signed as well, such as in the same manner in which the sensor readings are signed as described above using a hardware key. In this manner, an application 124 or remote service that receives and uses the machine learning model can verify both the authenticity of the model and the data used to train it.

In another example, a machine learning model on the device 104 is applied to signed sensor readings as described above to obtain a result, such as a classification. Accordingly, the result of the machine learning model can have the assurance of being based on authentic data. In some embodiments, the machine learning model may be executed in the secure context 120. The secure context 120 or the security component 121 may perform or be used to perform cryptographic signing of the result of the machine learning model and outputs the signed result to the security application 122 for forwarding to a requesting application 124 or remote service. The signed result may include the result of the machine learning model and other metadata such as an identifier of the machine learning model used (e.g., a hash of the machine learning model), with optionally attested geolocation and/or timestamp of the result of application of the machine learning model.

Figure 5:
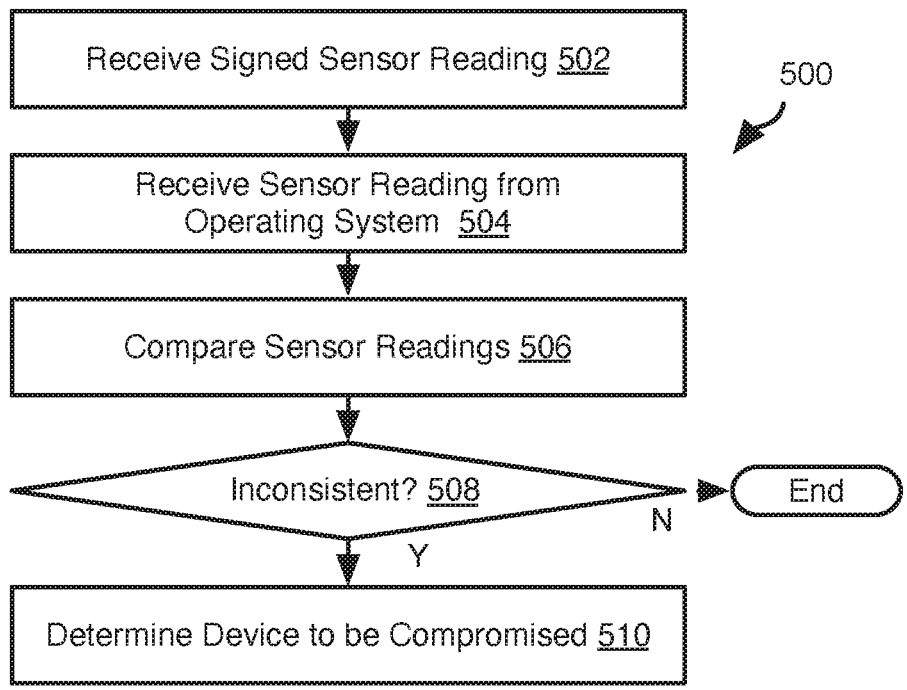
FIG. 5 is a process flow diagram of a method for detecting compromising of a device using signed sensor readings in accordance with an embodiment of the present invention.

FIG. 5 illustrates a method 500 that is another use case for a signed sensor reading. The method 500 may be executed by the security application 122 or by an application executing on a server system 102 or other server system, such as a cloud server. The method 500 may include receiving 502 a signed sensor reading according to the method 400. The method 500 may further include receiving 504 a sensor reading from the operating system 110. The reading from step 504 may be captured at the same time, e.g., within some time threshold from capturing of the sensor reading signed at step 502 such as less than 1 second, less than 100 ms, or less than 10 ms. Alternatively, the sensor reading signed at step 502 and the sensor reading received at step 504 may be responses to the same instruction to capture a sensor reading such that they should be identical unless deliberately altered.

The sensor readings from steps 502 and 504 may then be compared 506. The method 500 may then include evaluating 508 whether the sensor readings from steps 502 and 504 are consistent. For example, where the sensor reading is a location obtained from the GPS receiver 112, step 508 may include determining whether differences in the locations from steps 502 and 504 are within a threshold from one another, e.g., dt*Vmax, where dt is a time difference between the timestamps of the readings from steps 502 and 504 and Vmax is a predefined maximum velocity used to estimate whether a change in location is physically possible.

Other sensor data may likewise be compared to an estimate of physically permitted change or noise to determine whether readings from steps 502 and 504 are consistent. Where sensor readings should be identical if not deliberately altered, step 508 may include determining that the sensor readings from steps 502 and 504 are not consistent if not identical.

If the sensor readings from steps 502 and 504 are not found to be consistent, the device 104 may be determined 510 to be compromised by the device performing the method 500.

Figure 6:
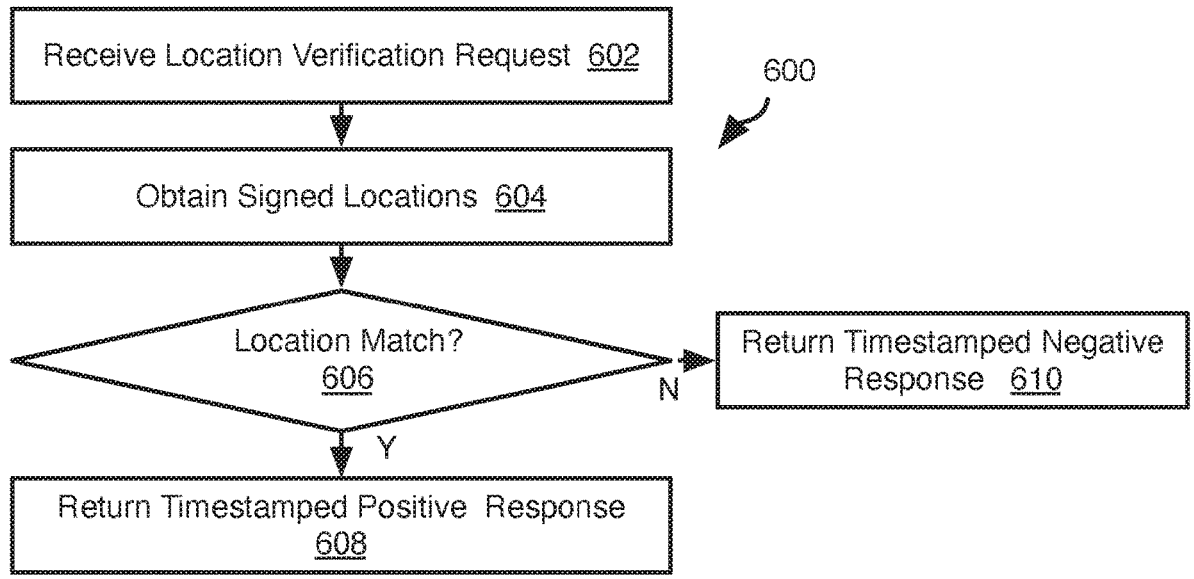
FIG. 6 is a process flow diagram of a method for performing location verification using a secure execution context in accordance with an embodiment of the present invention.

FIG. 6 illustrates another use case by which a security application 122 may use a signed sensor reading. The method 600 may include receiving 602, by the security application 122, a location verification request from a requester, such as the server system 102 or some other server system. The request may identify a region, such as in the form of vertices of a polygon, a GPS coordinate and a radius, an identifier of a city, metropolitan region, state, province, country, continent, or other geographic entity.

The security application 122 obtains 604 a signed location using the method 400 and evaluates 606 whether the signed location matches the region defined in the request, i.e. whether the location is within the region defined in the request. If so, the security application 122 returns 608 a positive response to the requester. The response may be time stamped with the timestamp of the signed sensor reading from step 604 thereby indicating the time in which the location of the device 104 was in the specified region. If the location does not match, the security application 122 may return 610 a negative response that may also be time stamped with the timestamp from the signed sensor reading. Note that the response whether positive or negative may itself also be cryptographically signed by the security application 122, secure context 120, or security component 121, such as using any of the approaches described above with respect to the method 400 for cryptographically signing a sensor reading. In this manner, the requester may verify that the response is authentic.

Figure 7:
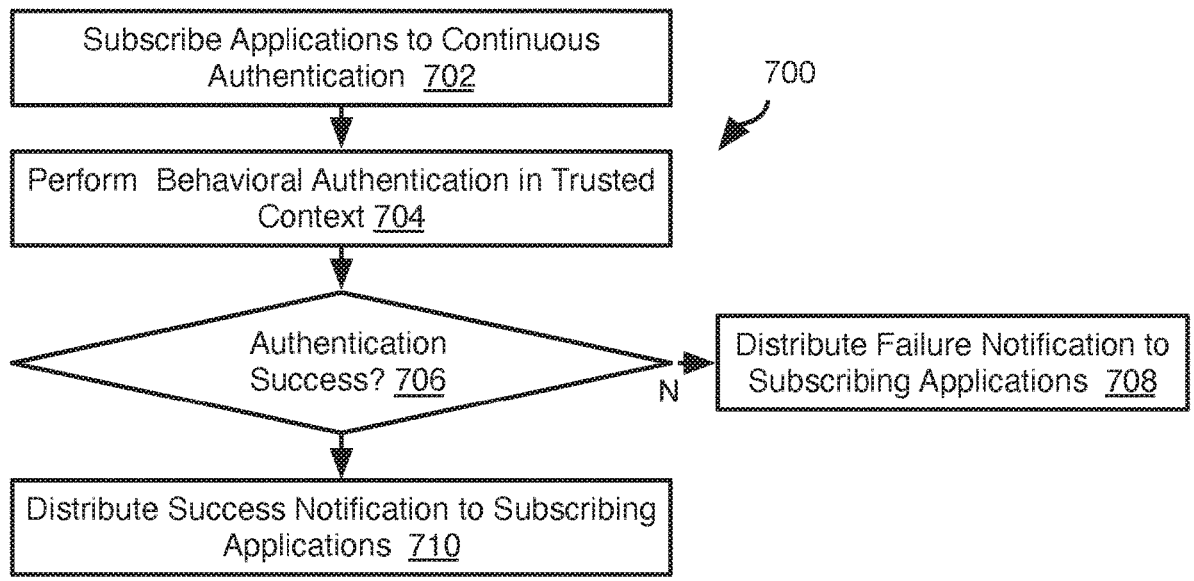
FIG. 7 is a process flow diagram of a method for providing shared continuous authentication in accordance with an embodiment of the present invention.

FIG. 7 illustrates a method 700 for providing continuous authentication on the device 104 using the secure context 120 and the security application 122. For the purpose of this application, "continuous" may be understood as authentication or identity verification occurring in addition to the initial authentication (e.g., at a frequency of at least once every minute, preferably at least once every 10 seconds or at least once a second). In other embodiments, "continuous" does not necessarily mean according to a fixed period. "Continuous" may instead mean throughout the duration of a session for which the initial authentication had been performed, which occurs one or more additional times throughout the duration of the session. The additional authentication/verification events may be configured to occur at regular time intervals, or to occur in response to triggering events occurring during the session. Such triggering events may include: actions taken by a user, physical movement of the device 104, user input gestures (typing, scrolling, touching, clicking, tapping, etc.), external network events, other physical events, security events, or a combination of any two or more of the previously-mentioned events.

One-time authentication of a user may not be sufficient for highly secure or sensitive operations in applications or connected services. A user may have authenticated to an application on the device 104 or to a network-connected service, but the authenticating user may have walked away from the device, handed the device over to a different user, or the user's credentials used for initial authentication may have been lost, stolen, or compromised. It would be desirable to have an ongoing behavioral biometric assessment of the likelihood that the current user of a device is the same as the one who performed an initial authentication, or as an authorized user for the application or service.

The method 700 may include subscribing 702, by the security application 122, one or more applications 124 or remote services to a continuous authentication service. For example, each application 124 or service that requires continuous authentication service may interface with the security application 122 to request this service and provide a connection between the security application 122 and the application 124 or service.

If multiple applications or services required such continuous authentication, it could result in duplicate processing of sensor data leading to unnecessary processing and resultant battery usage. Additionally, some behavioral biometrics are measures of what happens on a device 104 when there is an interaction between the user and the device 104, and a single application 124, due to containerization in the operating system 110 on the device for applications 124, may not be able to inspect all relevant such sensor readings.

The secure context 120 or the security component 121 accesses sensor readings and user interactions with the device 104 and performs 704 authentication. This may include behavior authentication that analyzes user interaction with the device to determine whether it corresponds to the behavior of the authenticated user. An example of this approach is described below with respect to FIG. 8. The secure context 120 or the security component 121 communicates its authentication determination to the security application 122.

If the user is not found 706 to be the authenticated user, the method 700 may include distributing 708, by the security application 122, notification of failed authentication to the subscribing applications 124 or services. If the user of the device 104 is found 706 to be the authenticated user by the secure context 120 or the security component 121, then either (a) no action is taken or (b) the secure context 120 or the security component 121 notifies the security application 122, which then distributes 710 notification of successful authentication to the subscribing applications 124 or services. Various configurations are possible: a failure to receive a notification within a time period may be interpreted by a subscribing application 124 or service to indicate failure of authentication such that no notification is provided upon failure at step 706 and notification is only provided upon successful authentication.

Steps 704 and 706 may be performed at a predefined interval, e.g., every 30, 20, or 10 seconds, or at some other interval, or upon a triggering event, such as detecting picking up of the device 104.

Figure 8:
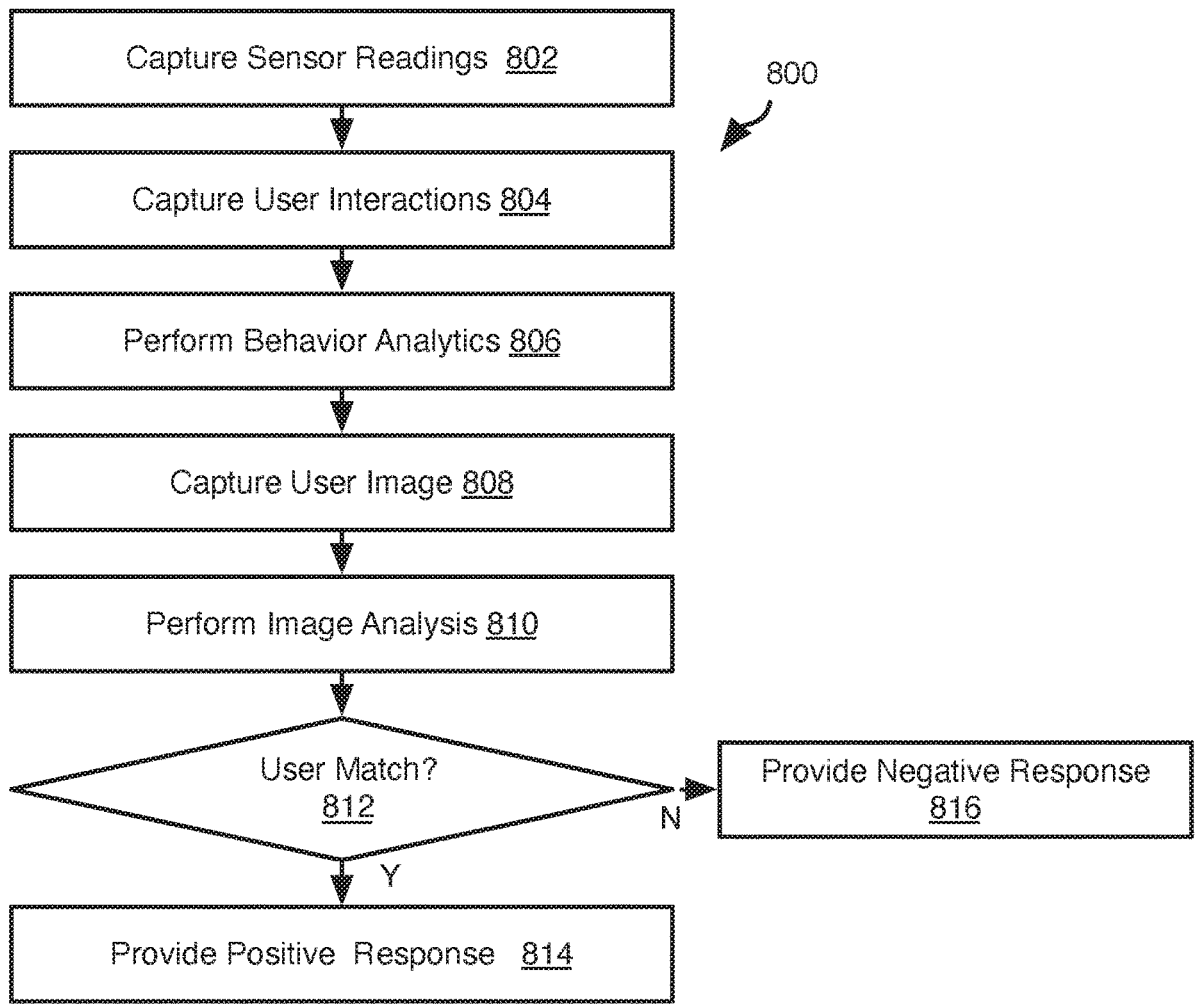
FIG. 8 is a process flow diagram of a method for performing behavior analytics using a secure execution context in accordance with an embodiment of the present invention.

FIG. 8 illustrates a method 800 for performing biometric authentication that may be used at steps 704 and 706 of the method 700. The method 800 may be performed by the secure context 120 or the security component 121 or by the security application 122 using signed sensor readings from the secure context 120.

The method 800 may include capturing 802 sensor readings from sensors of the device 104, such as from the accelerometer 114 and camera 116. The accelerometer 114 may further include a gyroscope and behavioral biometrics from the accelerometer 114 may device orientation, changes in device orientation, device tremor, gait, and the like.

The method 800 may further include capturing 804 user interactions with the device 104. This may particularly include interactions with interfaces of the device 104: touch behavior on a touch screen (touch placement, finger touch size, location, trajectory), typing behavior (models of time between key presses/soft-keyboard touches, etc.), non-touching gestures performed near the device and detected using reflected radio frequency (RF) signals (e.g., waving a hand over a device or hovering a finger above a portion of the device), or voice or speech or other audio input, or similar interactions with a locally proximate device which is connected to the device 104 (e.g., tapping or sensor readings from a smart watch worn by the user, where the smart watch is in communication with the user's device 104).

The method 800 may include performing 806 behavior analytics with respect to the sensor readings and user interactions captured at steps 802 and 804. The behavior analytics seeks to determine whether current captured data matches a behavior model of a user generated using past captured data. The manner in which behavior analytics is performed may be according to any approach known in the art. The output of step 806 may be a confidence value indicating an estimated level of certainty that the current user of the device 104 is the authenticated user based on the behavior analytics, or that the current user of the device 104 is the same user as the user who was using the device 104 at the time of the initial authentication.

In some embodiments, the behavior model used at step 806 may be generated by the secure context 120, security component 121, or by the security application 122 using signed sensor readings from the secure context 120. In particular, the secure context 120 or security component 121 obtains the sensor readings directly from the sensors of the device 104 and builds a model of user normal behavior and uses the model to assess subsequent user behavior detected using the sensors. As noted above, the user interactions captured at step 804 and those used to train the behavior model may include those of the user with respect to multiple applications 124 that are all accessible to the secure context 120.

Images of the user of the device 104 may also be captured 808 using the camera 116, (e.g., a front facing camera facing a same direction as the display of the device 104.) The method 810 may include performing image analysis 810, e.g., comparing a current captured image with one or more reference images known to be images of the authenticated user. Step 810 may include using any facial recognition and facial matching approach known in the art. The result of step 810 may be a confidence value indicating an estimated level of certainty that the current user of the device 104 is the authenticated user based on the image analysis.

The method 800 may include evaluating 812, by the secure context 120 or the security component 121, whether the current user of the device 104 is the authenticated user according to one or both of steps 806 and 810. For example, if the confidence level of either of steps 806 and 810 is above a threshold, the current user may be found to be the authenticated user. As an alternative, if a sum or weighted some of the confidence levels is found to be above a threshold value, the current user may be found to be the authenticated user.

If the user is found 812 to be the authenticated user, the result of the method 800 is a positive identification that is provided 814 by the secure context 120 or the security component 121 to the security application 122. Otherwise, a negative result is provided 816 by the secure context 120 or the security component 121 to the security application 122.

Figure 9:
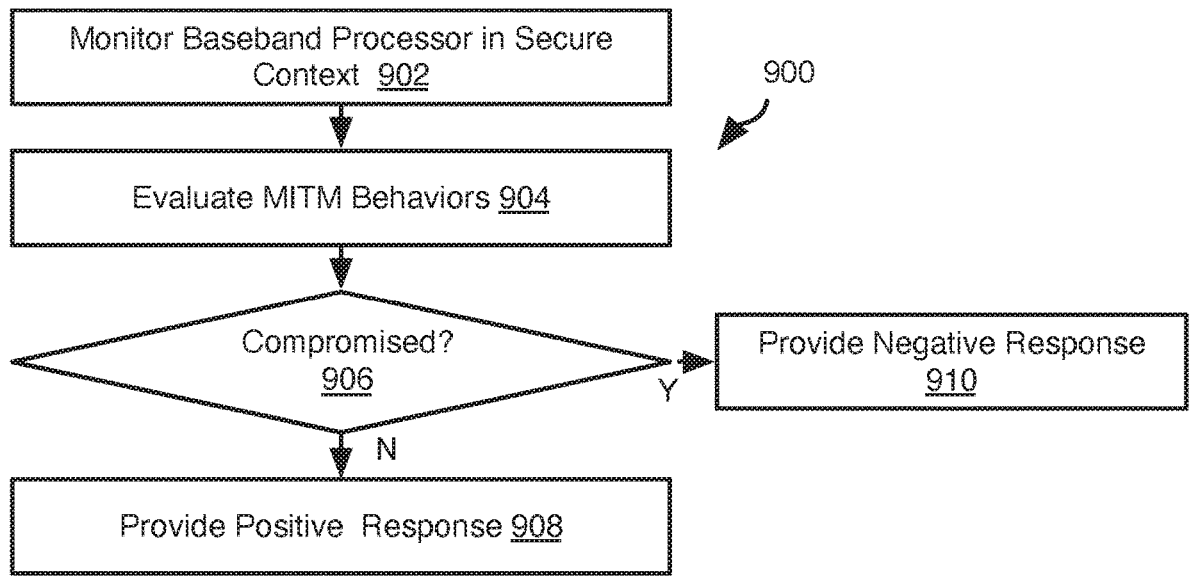
FIG. 9 is a process flow diagram of a method for monitoring a baseband processor using a secure execution context in accordance with an embodiment of the present invention.

FIG. 9 illustrates a method 900 for monitoring behavior of the baseband processor 118 on the device 104 using the secure context 120 or the security component 121 and the security application 122. The method 900 may include monitoring 902 behavior of the baseband processor 118. The secure context 120 or the security component 121 may evaluate the behavior to determine whether there is an indication of a man-in the-middle (MITM) attack. For example, step 904 may include obtaining an encryption verification from the baseband processor 118. The secure context 120 or security component 121 may verify whether the baseband processor 118 has experienced a protocol downgrade (from 5G to 2G, for example) such that encryption is no longer being performed by the baseband processor 118. This is a common approach of MITM attacks.

In another example, step 904 may include evaluating, by the secure context 120 or security component 121, the baseband processor 118 to detect a connection to a spurious network station (cellular or Wi-Fi or other wireless communication). This technique is unique in being able to provide MITM detection in a manner independent from the device's operating system 110 would provide additional assurances regarding security.

In another example, step 904 may include evaluating, by the secure context 120 or security component 121, whether the baseband processor 118 has connected to an untrustworthy destination, including but not limited to: unsafe browsing sites, detected phishing attack sites, command and control servers for botnets or malware, untrusted devices attempting peer-to-peer connections, etc. Step 904 may include detecting a destination (e.g., URL) to which the baseband processor 118 has connected or will connect to and comparing that destination to that referenced by the operating system 110, e.g. in a system call to the baseband processor 118. If these destinations do not match, then the device 104 may be determined to be compromised.

If the baseband processor 118 is not found 906 to be subject to a MITM attack, a positive response maybe provided 908 to an application 124, the server 102, or other service that invoked execution of the method 900, such as from the secure context 120 or security component 121 by way of the security application 122. For example, the result may be provided to a registered address of the server 102 as in other examples described above. If the device 104 is found 906 to be subject to a MITM attack then a negative result is provided. Which may include a notification to the registered address indicting that the device 104 is compromised. Steps 908, 910 may include the secure context 120 or the security component 121 providing the result of the evaluation 906 to the security application 122, which then provides the notifications.

The method 900 is described as being performed by the secure context 120 or security component 121 with respect to the baseband processor 118. In other embodiments, the method 900 may be performed within the baseband processor 118, a modem of the device 104, or other component of the device 104. For example, there may be first and second baseband processors such that a second baseband processor can be configured to monitor the behavior of the first baseband processor and determine whether the first baseband processor is compromised, the first baseband processor performing the communication functions ascribed herein to the baseband processor 118.

Figure 10:
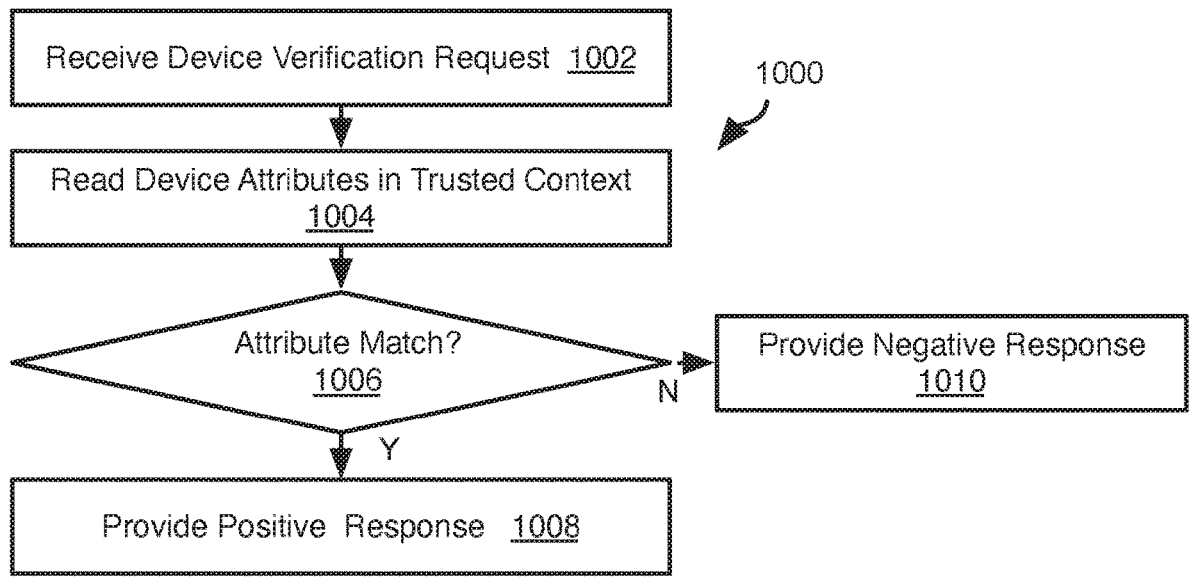
FIG. 10 is a process flow diagram of a method for verifying identity of a device in accordance with an embodiment of the present invention.

FIG. 10 illustrates a method 1000 for verifying the identity of the device 104 using the secure context 120 or the security component 121 and the security application 122. The method 1000 may include receiving 1002, by the security application 122 a device verification request, such as from the server system 102 or other server. For example, a mobile carrier may desire to verify the identity of a device before associating it with the phone number and account of a user (e.g., before performing subscriber identity module (SIM) porting). Verification may be helpful for identifying cloned devices.

In response to the request, the security application 122 requests that the secure context 120 or the security component 121 reads 1004 device attributes. These device attributes may include the mobile station equipment identity (IMEI) number of the device 104. Step 1004 may include performing a sensor and/or hardware verification in response to the request from step 1002. For example, when a request for SIM porting is received, hardware verification can be performed to confirm that while the SIM was switched, the remaining hardware on the device remained unchanged. This may include verifying the type, serial number, or other attributes of components of the device 104, such as the processor, memory modules, flash storage devices, the sensors 112, 114, 116, the baseband processor, screen, or other components of the device 104.

If the attributes evaluated at step 1004 are found 1006 to match, then the secure context 120 or the security component 121 may communicate this to the security application, which provides 1008 a positive response to the requester from step 1002, e.g., transmits a positive response to the server from which the request was received. If the attributes are found 1006 not to match, e.g. there is not a complete match of those attributes evaluated or a major portion of the attributes evaluated do not match, a negative response is provided 1010 to the requester. For example, the secure context 120 or the security component 121 notifies the security application 122 of this fact and the security application 122 notifies the requester.

The requester may take action if the response is negative, such as denying SIM porting or requiring additional information (e.g., authentication) before allowing the phone number to be ported to the device 104. These techniques can be used to lower the risk of SIM porting attacks. In another example, a service responsible for monetary transfers can use hardware verification according to the method 1000 to determine whether to perform transfers.

Figure 11:
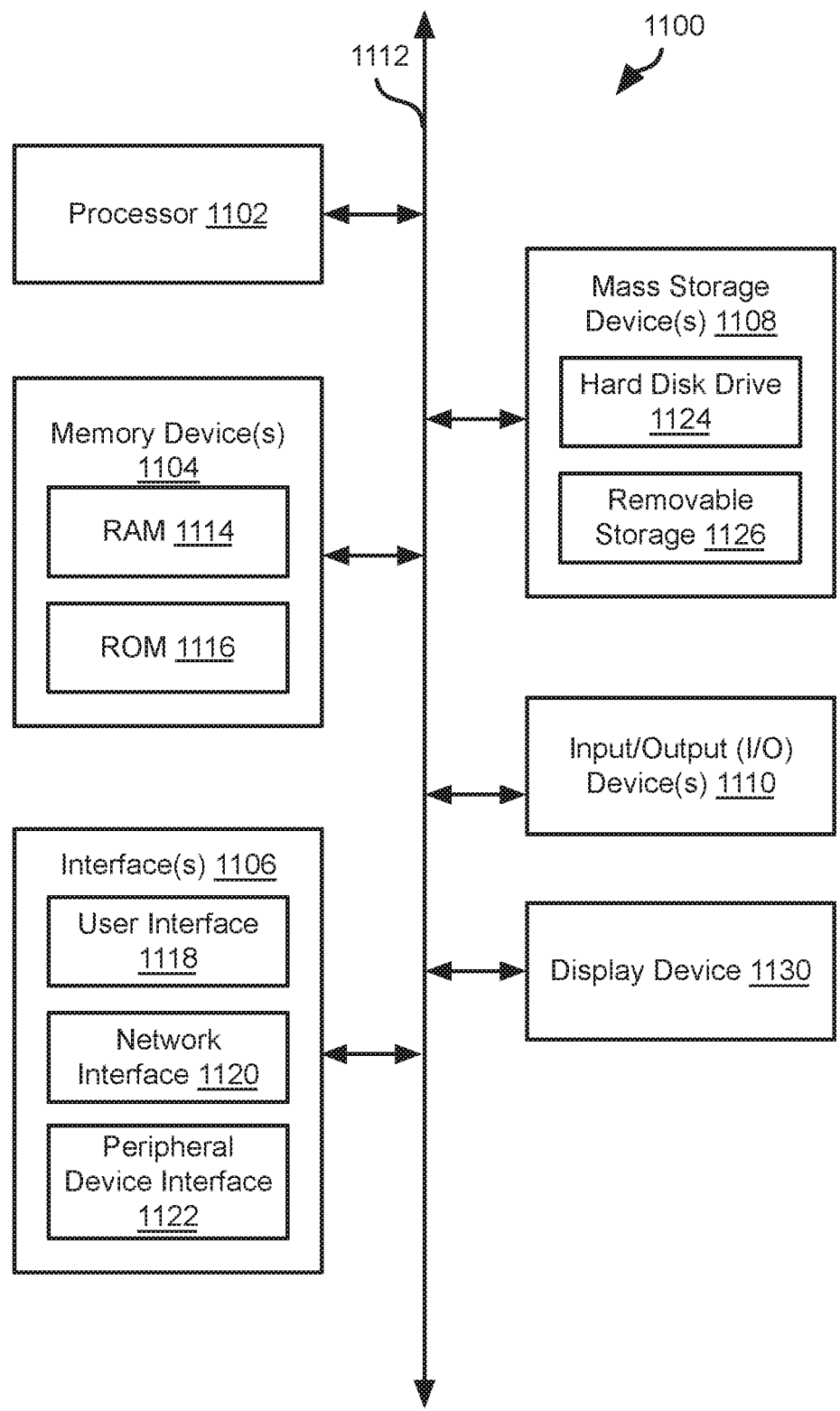
FIG. 11 is a schematic block diagram of a computer system suitable for implementing methods in accordance with embodiments of the present invention.

FIG. 11 is a block diagram illustrating an example computing device 1100 which can be used to implement the system and methods disclosed herein. The one or more computers of the server system 102 and the devices 104 may have some or all of the attributes of the computing device 1100. In some embodiments, a cluster of computing devices interconnected by a network may be used to implement any one or more components of the invention.

Computing device 1100 may be used to perform various procedures, such as those discussed herein. Computing device 1100 can function as a server, a client, or any other computing entity. Computing device can perform various monitoring functions as discussed herein, and can execute one or more application programs, such as the application programs described herein. Computing device 1100 can be any of a wide variety of computing devices, such as a desktop computer, a notebook computer, a server computer, a handheld computer, tablet computer and the like.

Computing device 1100 includes one or more processor(s) 1102, one or more memory device(s) 1104, one or more interface(s) 1106, one or more mass storage device(s) 1108, one or more Input/Output (I/O) device(s) 1110, and a display device 1130 all of which are coupled to a bus 1112. Processor(s) 1102 include one or more processors or controllers that execute instructions stored in memory device(s) 1104 and/or mass storage device(s) 1108. Processor(s) 1102 may also include various types of computer-readable media, such as cache memory.

Memory device(s) 1104 include various computer-readable media, such as volatile memory (e.g., random access memory (RAM) 1114) and/or nonvolatile memory (e.g., read-only memory (ROM) 1116). Memory device(s) 1104 may also include rewritable ROM, such as Flash memory.

Mass storage device(s) 1108 include various computer readable media, such as magnetic tapes, magnetic disks, optical disks, solid-state memory (e.g., Flash memory), and so forth. As shown in FIG. 11, a particular mass storage device is a hard disk drive 1124. Various drives may also be included in mass storage device(s) 1108 to enable reading from and/or writing to the various computer readable media. Mass storage device(s) 1108 include removable media 1126 and/or non-removable media.

I/O device(s) 1110 include various devices that allow data and/or other information to be input to or retrieved from computing device 1100. Example I/O device(s) 1110 include cursor control devices, keyboards, keypads, touchscreens, microphones, monitors or other display devices, speakers, printers, network interface cards, modems, lenses, CCDs or other image capture devices, RF or infrared emitters and receivers, and the like.

Display device 1130 includes any type of device capable of displaying information to one or more users of computing device 1100. Examples of display device 1130 include a monitor, display terminal, video projection device, and the like.

Interface(s) 1106 include various interfaces that allow computing device 1100 to interact with other systems, devices, or computing environments. Example interface(s) 1106 include any number of different network interfaces 1120, such as interfaces to local area networks (LANs), wide area networks (WANs), wireless networks, and the Internet. Other interface(s) include user interface 1118 and peripheral device interface 1122. The interface(s) 1106 may also include one or more user interface elements 1118. The interface(s) 1106 may also include one or more peripheral interfaces such as interfaces for printers, pointing devices (mice, track pad, etc.), keyboards, and the like.

Bus 1112 allows processor(s) 1102, memory device(s) 1104, interface(s) 1106, mass storage device(s) 1108, and I/O device(s) 1110 to communicate with one another, as well as other devices or components coupled to bus 1112. Bus 1112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1100, and are executed by processor(s) 1102. Alternatively, the systems and procedures described herein can be implemented in hardware, or a combination of hardware, software, and/or firmware. For example, one or more application specific integrated circuits (ASICs), digital signal processors (DSPs), field programmable gate array (FPGA), microcontroller (MCU), or special purpose processors (motion coprocessor, neural processor, etc.) can be programmed to carry out one or more of the systems and procedures described herein.

The invention claimed is:

1. A method comprising:
providing, via a processor, a secure execution context representing an isolated and secure operating system on a device, the device including one or more sensors;
providing an operating system representing a software supporting device functions and excluding the secure execution context;
receiving, by the secure execution context, first data representing information about a state of the device, the state of the device including the physical environment of the device, the first data being a first reading from the one or more sensors obtained within the secure execution context;
requesting from the operating system second data representing the state of the device, the second data being a second reading from the one or more sensors obtained by the operating system;
receiving, from the operating system, the second data;
comparing, in the secure execution context, the first data and the second data to obtain a comparison result; and
based on the comparison result, returning a determination whether to perform an action representing a response to a mismatch between the first data and the second data.

2. The method of claim 1, further comprising:
providing a security application executing within the operating system, the security application defining an interface to the secure execution context;
wherein requesting the second data from the operating system comprises requesting, by the security application, the second data.

3. The method of claim 1, wherein the device further comprises a persistent storage device and the state of the device includes an evaluation of a portion of a file system of the device storing files of the operating system.

4. The method of claim 3, wherein the state of the device includes a result of monitoring of writes to the file system.

5. The method of claim 4, wherein the state of the device includes a determination as to whether the operating system has been compromised.

6. The method of claim 1, further comprising cryptographically signing the first reading using a hardware key of the device.

7. The method of claim 1, wherein the one or more sensors include a camera and the first reading is pixel data obtained from the camera.

8. The method of claim 1, wherein the one or more sensors include a global positioning system (GPS) receiver and the first reading is a location obtained from the GPS receiver.

9. The method of claim 8, further comprising:
receiving a region definition;
evaluating, on the device, whether the location is within the region definition; and
returning a result of the evaluating.

10. The method of claim 8, wherein the location is a first location, the method further comprising:
obtaining, by the operating system, a second location, the second location being the second data;
comparing the first location to the second location; and
when the first location and the second location are not consistent, determining that the operating system is compromised.

11. The method of claim 1, wherein the device further comprises components including at least one of a camera, a touch screen, and an accelerometer, the method further comprising:
obtaining an authentication status of a user of the device obtained by performing, in the secure context, behavioral analysis of the user based on outputs of the components.

12. The method of claim 11, further comprising:
providing a security application executing within the operating system, the security application defining an interface to the secure execution context;
providing a plurality of other applications executing within the operating system;
subscribing, by the plurality of other applications, to authentication by the security application; and
distributing, by the security application, the authentication status.

13. The method of claim 1, wherein the device further comprises a baseband processor configured to manage wireless communication of the device, the method further comprising evaluating whether a state of the baseband processor indicates a man-in-the-middle (MITM) attack.

14. The method of claim 1, wherein the device further comprises a baseband processor configured to manage wireless communication of the device, the method further comprising evaluating whether the baseband processor is encrypting transmitted data.

15. A mobile device comprising:
one or more processing devices, the one or more processing devices defining a secure execution context, the device including one or more sensors; and
one or more memory devices coupled to the one or more processing devices, the one or more memory devices storing executable code that, when executed by the one or more processing devices, causes the one or more processing devices to:
provide an operating system representing a software supporting device functions and excluding the secure execution context;
determine in the secure execution context first data representing information about a state of a device including the one or more processing devices, the state of the device including the physical environment of the device, the first data being a first reading from the one or more sensors obtained within the secure execution context;
request from the operating system second data representing the state of the device, the second data being a second reading from the one or more sensors obtained by the operating system;
receive, from the operating system the second data;
compare, in the secure execution context, the first data and the second data to obtain a comparison result; and
based on the comparison result, returning a determination whether to perform an action representing a response to a mismatch between the first data and the second data.

16. The mobile device of claim 15, wherein the state of the device includes at least one of:
a state of a portion of a file system storing an operating system of the device;
a location of the device;
an output of a sensor of the device; and
a state of encryption of data transmitted from the device.

17. The mobile device of claim 15, wherein the executable code when executed by the one or more processing devices, causes the one or more processing devices to cryptographically sign the first data using a hardware key of the device.

18. The mobile device of claim 15, wherein the executable code comprises a security application defining an interface to the secure execution context.

19. A non-transitory computer-readable medium storing executable code that, when executed by one or more processing devices, causes the one or more processing devices to:
- provide an operating system representing a software supporting device functions and excluding a secure execution context implemented by the one or more processing devices;
- determine in the secure execution context first data representing information about a state of a device including the one or more processing devices, the state of the device including the physical environment of the device, the first data being a first reading from the one or more sensors obtained within the secure execution context;
- request from the operating system second data representing the state of the device, the second data being a second reading from the one or more sensors obtained by the operating system;
- receive, from the operating system the second data;
- compare, in the secure execution context, the first data and the second data to obtain a comparison result; and
- based on the comparison result, returning a determination whether to perform an action representing a response to a mismatch between the first data and the second data.

* * * * *